US009607107B2

(12) United States Patent  
Hamada (10) Patent No.: US 9,607,107 B2  
(45) Date of Patent: Mar. 28, 2017

(54) INFORMATION PROCESSING APPARATUS AND INFORMATION PROCESSING METHOD

(75) Inventor: Yoshinobu Hamada, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1199 days.

(21) Appl. No.: 12/116,121

(22) Filed: May 6, 2008

(65) Prior Publication Data

US 2008/0282200 A1 Nov. 13, 2008

(30) Foreign Application Priority Data

May 10, 2007 (JP) ................................. 2007-125533

(51) Int. Cl.
G06F 17/30 (2006.01)

(52) U.S. Cl.
CPC .............. G06F 17/30994 (2013.01)

(58) Field of Classification Search
CPC .. G06F 9/4446; G06F 3/0481; G06F 3/04812; G06F 3/0482
USPC ................... 715/764, 774; 386/290; 345/440
See application file for complete search history.

(56) References Cited

U.S. PATENT DOCUMENTS

| | | | |
|---|---|---|---|
| 5,717,914 A * | 2/1998 | Husick et al. | |
| 5,784,608 A * | 7/1998 | Meske et al. | |
| 5,799,303 A | 8/1998 | Tsuchimura | |
| 7,512,881 B2 | 3/2009 | Haynes et al. | |
| 2002/0103789 A1* | 8/2002 | Turnbull | G06F 17/30867 |
| 2003/0023583 A1 | 1/2003 | Eko | |
| 2004/0230599 A1* | 11/2004 | Moore et al. | 707/102 |
| 2005/0037814 A1 | 2/2005 | Yasui et al. | |
| 2005/0192955 A1* | 9/2005 | Farrell | G06F 17/30958 |
| 2006/0024604 A1 | 2/2006 | Sugiura | |
| 2006/0080303 A1* | 4/2006 | Sargent | G06F 17/30613 |
| 2006/0100998 A1* | 5/2006 | Edwards | G06F 17/30654 |
| 2006/0171674 A1* | 8/2006 | Yoshida et al. | 386/95 |
| 2007/0136274 A1* | 6/2007 | Takuma | G06F 17/3061 |
| 2007/0179995 A1* | 8/2007 | Prahlad | G06F 17/30528 |

(Continued)

FOREIGN PATENT DOCUMENTS

| | | |
|---|---|---|
| CN | 1556946 | 12/2004 |
| JP | 8016562 A | 1/1996 |

(Continued)

OTHER PUBLICATIONS

Chinese Office Action dated Feb. 12, 2010 in corresponding Chinese Application No. 200810096159.2.

(Continued)

*Primary Examiner* — Jeffrey A Gaffin
*Assistant Examiner* — Mandrita Brahmachari
(74) *Attorney, Agent, or Firm* — Fitzpatrick, Cella, Harper & Scinto (57) ABSTRACT

To provide a method for displaying a list of contents divided in plural pages by saving a trouble for finding the desired contents. If the user puts (hovers) a cursor over an index for displaying a divided partial list, the attribute values of the contents included in the partial list corresponding to the index are displayed. Also, it is suitable that the attribute values displayed at this time are configured so that the attribute values used for sort may be displayed as a tooltip.

17 Claims, 10 Drawing Sheets

(56) References Cited

U.S. PATENT DOCUMENTS

2008/0065758 A1\* 3/2008 Narayanaswami .. G06Q 10/107
709/224

FOREIGN PATENT DOCUMENTS

| | | |
|---|---|---|
| JP | 2002-108912 | 4/2002 |
| JP | 2002-183210 | 6/2002 |
| JP | 2003-507820 | 2/2003 |
| JP | 2006-506698 | 2/2006 |
| KR | 1020050061534 A | 6/2005 |

OTHER PUBLICATIONS

Korean Official Notice of Rejection dated Sep. 21, 2009 in corresponding Korean Application No. 10-2008-0043441, and English language translation thereof.
Japanese Office Action dated Sep. 13, 2012 in Japanese application No. 2011-256502.
Japanese Office Action dated Oct. 1, 2013 issued during prosecution of related Japanese application No. 2013-001140.
"Yahoo! Developer Network", Design Pattern Library Search Pagination, Yahoo! Inc., 2006.
Japanese Notice of Refusal dated Jun. 10, 2014 issued during prosecution of related Japanese application No. 2013-001140 (Whole English-language translation included).

\* cited by examiner

| NUMBER | DOCUMENT NAME | UPDATE DATE AND TIME | TYPE | CAPACITY | STORAGE LOCATION |
|---|---|---|---|---|---|
| 1 | DATABASE CREATION PROCEDURES MANUAL | 2002/12/20 15:54:23 | .doc | 238592 | DEVELOPMENT HEADQUARTERS > THIRD DEVELOPMENT DEPARTMENT > DB |
| 2 | PRINT PROCEDURE | 2003/02/27 19:36:44 | .doc | 543744 | PLANNING HEADQUARTERS > SECOND PLANNING DEPARTMENT > SECOND SECTION OF PLANNING > PLANNING MANUAL |
| 3 | REJECTION PROCEDURES MANUAL | 2003/03/03 09:47:12 | .pdf | 73728 | PERSONNEL HEADQUARTERS > FIRST SECTION OF PERSONNEL > PERSONAL INFORMATION HANDLING |
| ... | | | | | |
| 10 | ABOUT APPLICATION FOR TRAINING | 2003/08/31 08:52:59 | .html | 59392 | PERSONNEL HEADQUARTERS > SECOND SECTION OF PERSONNEL > TRAINING |
| 11 | FACILITIES RESERVATION SYSTEM | 2003/09/05 12:13:41 | .pdf | 135168 | INFORMATION SYSTEM HEADQUARTERS > FACILITIES RESERVATION |
| ... | | | | | |
| 20 | DATA ACQUISITION PROCEDURES MANUAL | 2004/07/11 17:21:06 | .txt | 37888 | DEVELOPMENT HEADQUARTERS > FOURTH DEVELOPMENT DEPARTMENT > TROUBLESHOOTING |
| 21 | MAINTENANCE WORKING MEMO | 2004/08/23 13:42:55 | .txt | 113664 | DEVELOPMENT HEADQUARTERS > THIRD DEVELOPMENT DEPARTMENT > MAINTENANCE |
| ... | | | | | |
| 30 | SERVER SETUP | 2005/05/16 18:15:10 | .doc | 86016 | DEVELOPMENT HEADQUARTERS > THIRD DEVELOPMENT DEPARTMENT > CONSTRUCTION |

```
<html>
  ..
  <a href="http://XXX/yyy/zzz?p=1" title="2002/12/20 15:54 - 2003/08/31 08:52">← PREVIOUS 10 ITEMS </a>
   
  <a href="http://XXX/yyy/zzz?p=1" title="2002/12/20 15:54 - 2003/08/31 08:52">1</a>
   
  <a href="http://XXX/yyy/zzz?p=2" title="2003/09/05 12:13 - 2004/07/11 17:21">2</a>
  <a href="http://XXX/yyy/zzz?p=3" title="2004/08/23 13:42 - 2005/05/16 18:15">3</a>
   
  ..
  <a href="http://XXX/yyy/zzz?p=3" title="2004/08/23 13:42 - 2005/05/16 18:15"> NEXT 10 ITEMS →</a>
  ..
</html>
```

INFORMATION PROCESSING APPARATUS AND INFORMATION PROCESSING METHOD

BACKGROUND OF THE INVENTION

Field of the Invention

The present invention relates to an information processing apparatus and information processing method for displaying a list of contents in which the list of contents for document data or image data is divided and displayed.

Description of the Related Art

In recent years, a contents management system has spread in which the electronic documents or the contents at a Web site on the Internet can be registered and retrieved by keyword.

In such system, when many contents are hit by retrieval, the results are divided in units of ten to several tens items and displayed to reduce the data transfer amount to the display side or the memory capacity required on the display side. An order of display at this time is in most cases given by sorting in sequence from the contents of the highest score according to a score method inherent to the system. Such a display method is considered to be effective in the situation where there is almost no preliminary knowledge about the desired contents.

By the way, when a document is retrieved in a document management system within the Intranet or on one's own personal computer, the situation is considered different from searching the Web site at random without any clue with a search engine of the Internet. For example, the user has referred to a desired document before, or heard orally from the creator of document when the document was created, whereby the user has often preliminary knowledge about the document. However, with the above method, the documents are ordered by the score method without regard to such preliminary knowledge, whereby it is unknown in which number's list the desired document exists. Therefore, when there are many hit items, the list of divided results must be changed exhaustively until the desired document is found, taking a lot of trouble.

Also, there is a system in which the list of retrieval results can be sorted using a predetermined attribute that the contents have. In this system, the contents displayed near the lead or end of all the retrieval results by sorting can be easily found. However, in how manieth list other contents are included is not known after all, unless the user changes the list of divided retrieval results and displays it. Therefore, to find the desired contents, the user had to change the list of divided retrieval results exhaustively, taking a lot of trouble.

On the other hand, a method for displaying the retrieval results like a tree structure by classifying beforehand the contents into the hierarchical groups without dividing the results was proposed in Japanese Patent Laid-Open No. 2002-183210.

With this method, in displaying the retrieval results, the group names are only displayed, and when the user selects a group, the contents hit within the group are displayed. Further, the groups are classified in color according to the number of hit contents, or the maximum reference number or maximum matching degree of hit contents within the group is displayed associated with the group name.

However, with the above method, the user could find at once the contents included in the group having the maximum reference number or matching degree among the retrieval results, but did not know in what group the other contents were included. Therefore, the user needed to expand all the groups exhaustively after all to find the desired contents, taking a lot of trouble.

SUMMARY OF THE INVENTION

In order to solve the above-mentioned problem, the invention provides an information processing apparatus for displaying a list of plural contents stored in a storage device on a display, comprising sort means for sorting the contents of list display objects based on attribute value, division means for dividing the list of contents sorted by the sort means into plural partial lists, decision means for deciding any of the plural partial lists as a display object, index creation means for creating an index corresponding to each of the plural partial lists, and display data creation means for creating display data for displaying on the display a partial list decided by the decision means and the index created by the index creation means, wherein when a cursor is put on the index displayed on the display, the attribute values of the contents included in the partial list corresponding to the index on which the cursor is put are displayed.

With the invention, the desired retrieval result can be easily found from among the list of retrieval results divided into plural pages and displayed, whereby the user is relieved of trouble.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DESCRIPTION OF THE EMBODIMENTS

Embodiment 1

The preferred embodiments of the present invention will be described below in detail with reference to the accompanying drawings. First of all, a first embodiment of the invention will be described below.

Figure 1:
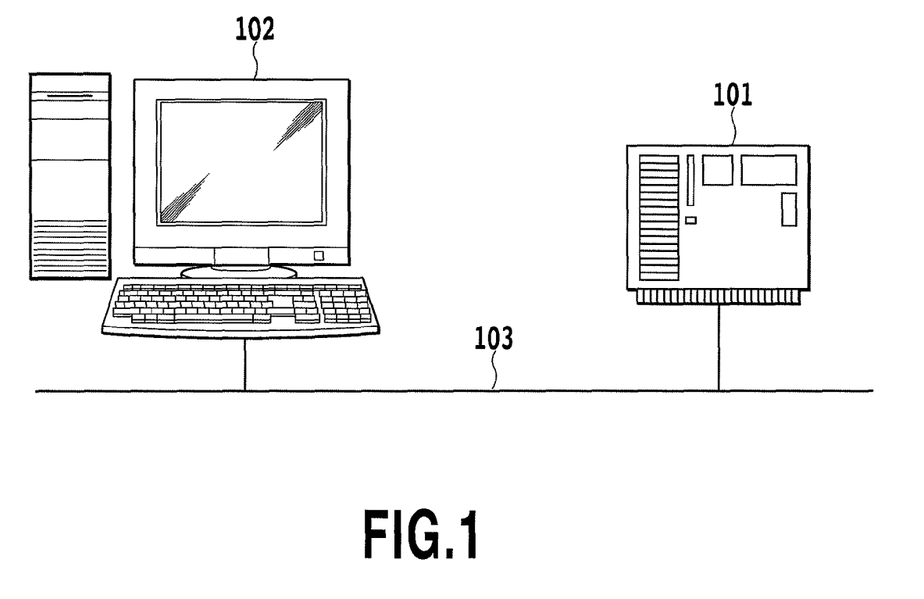
FIG. 1 is a view showing a hardware according to the present invention.

FIG. 1 shows a hardware according to this embodiment. In FIG. 1, a client computer 102 is connected via a network 103 to a document management server 101 for managing the document contents (document file). Herein, the network 103 is the Internet, for example. The client computer 102 makes a request for retrieval to the document management server 101 through the network 103 and receives and displays the results of retrieval from the document management server. To simplify the explanation, one server and one client computer are only shown in FIG. 1, but multiple servers or multiple client computers may be provided.

Figure 2:
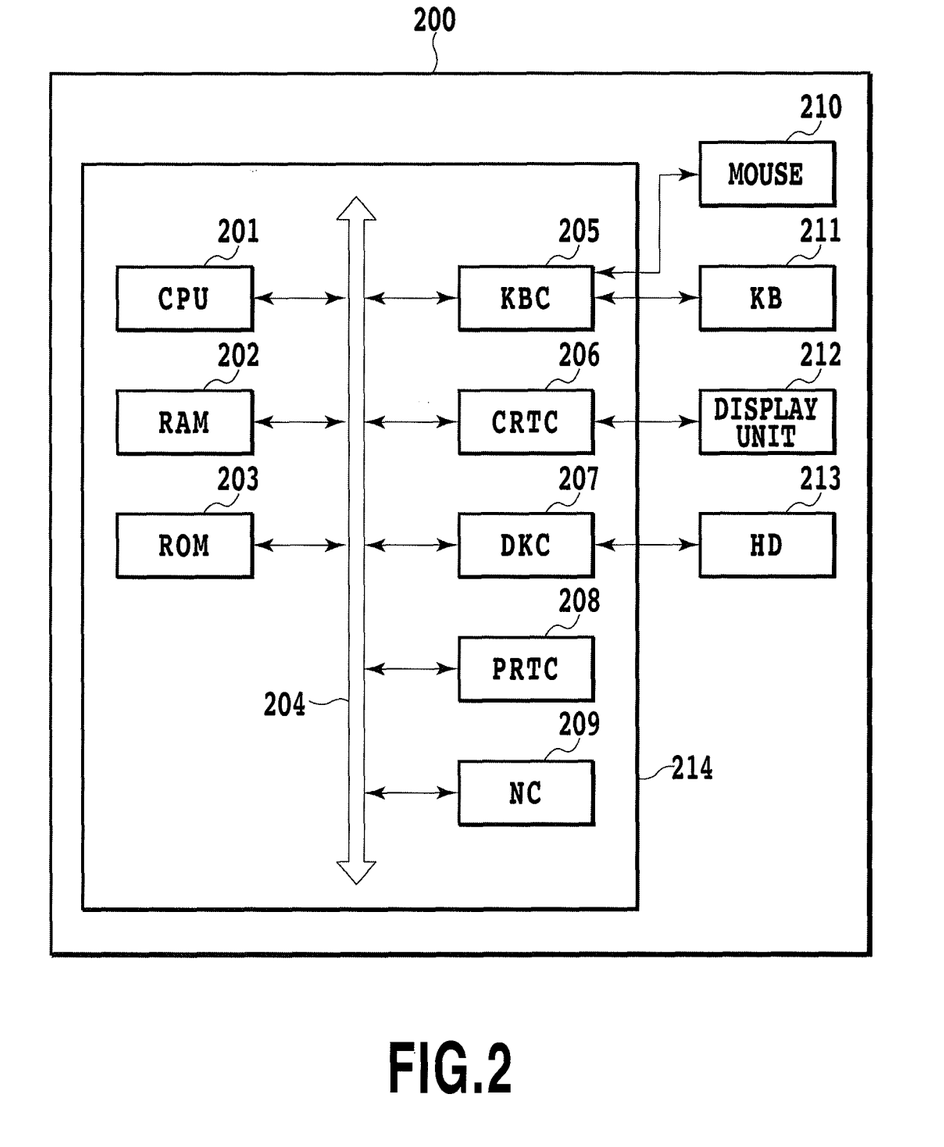
FIG. 2 is a block diagram showing one example of an internal structure of the hardware according to the invention.

FIG. 2 is a block diagram showing a typical internal structure 200 of the document management server 101 or the client computer 102. These may be implemented by installing a computer program for realizing the invention into a computer (information processing apparatus), commercially available on the market, or using a dedicated apparatus.

In FIG. 2, a CPU 201 is connected through a system bus 204 to a RAM 202 and a ROM 203. Also, the CPU 201 is connected through the system bus 204 to a keyboard controller (KBC) 205, a CRT controller (CRTC) 206 and a disk controller (DKC) 207. Further, the CPU 201 is connected through the system bus 204 to a printer controller (PRTC) 208 and a network controller (NC) 209.

Also, a mouse 210 and a keyboard (KB) 211 are connected to the keyboard controller (KBC) 205 in FIG. 2. Further, a display unit 212 is connected to the CRT controller (CRTC) 206 and a hard disk (HD) 213 is connected to the disk controller (DKC) 207.

The CPU 201 executes an OS program or a program for implementing the invention stored in a program ROM of the ROM 203 or loaded from the hard disk (HD) 213 into the RAM 202. The RAM 202 functions as a main memory or a work area for the CPU 201. The keyboard controller (KBC) 205 controls a key input from the keyboard (KB) 211 or an input from the mouse 210 as a pointing device. The CRT controller (CRTC) 206 controls the display on the display unit 212. This display unit 212 is not limited to a CRT, but may be a liquid crystal display, for example. The disk controller (DKC) 207 controls access to an external storage device such as the hard disk (HD) 213 storing a boot program, various applications and user data, or a flexible disk, not shown. The printer controller (PRTC) 208 controls the exchange of signal with a printer, when connected. The network controller (NC) 209, connected to the network, performs a communication control process with another apparatus connected to the network.

In this embodiment, it is supposed that a computer program for implementing the invention is performed on the information processing apparatus such as a document management server. This computer program enables the information processing apparatus to function as each processing part (processing means) for performing each process of a flowchart as will be described later. These computer programs executable on a computer are stored in a computer readable storage medium such as the hard disk.

Next, a user interface for issuing a request for displaying a list of documents (contents) will be described below.

Figure 3:
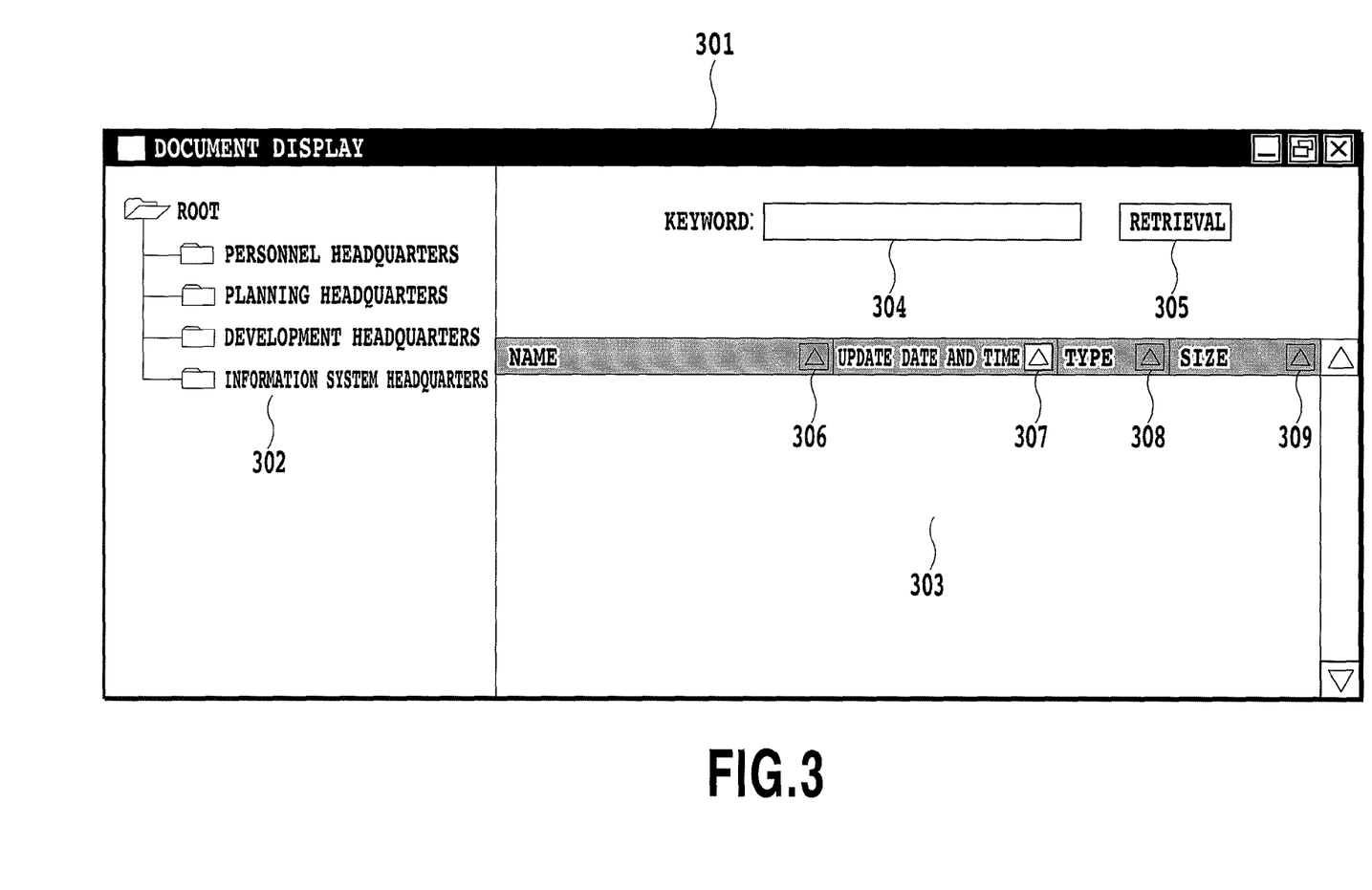
FIG. 3 is a view showing one example of a user interface according to the invention.

FIG. 3 is an example of the user interface for issuing the request for displaying the list of documents, which is displayed on the client computer 102.

In FIG. 3, the list of documents is displayed in a window 301.

In FIG. 3, the structure of a folder created within the document management server 101 is displayed in a folder tree 302. The user can select the folder within which the user wants to display the list of documents from the folder tree 302.

In FIG. 3, the list of documents within the folder selected by the user is displayed in a list display area 303. In a state of the user interface as shown in FIG. 3, the folder is unselected and the list of documents is not yet displayed.

In FIG. 3, a keyword for the user to retrieve the document is inputted into a keyword input area 304. If the user presses a retrieval button 305 in FIG. 3, the keyword inputted into the keyword input area 304 is sent to the document management server 101, which then performs retrieval of the document. The client computer 102 receives the retrieval results from the document management server 101 and displays the list of documents as the retrieval results in the list display area 303.

In this way, the list display area 303 is used to display the list of documents within the folder selected from the folder tree by the user, or display the list of documents as the retrieval results.

In FIG. 3, the sort buttons 306 to 309 indicate the attributes used for sort by the document management server 101 and whether the sort order is ascending or descending. If the user manipulates the sort buttons 306 to 309, information on the sort attribute and sort order is sent to the document management server 101, which changes the attribute used for sort or the sort order, based on the information. The client computer 102 displays the sort buttons 306 to 309 by combining the display contrast and the upward or downward orientation of a triangle within the button. The client computer 102 necessarily displays only one of the sort buttons 306 to 309 in high contrast. The sort button in high contrast indicates an item used for sort in the document management server 101 in displaying the list of documents. At this time, if the orientation of the triangle for the sort button in high contrast is upward, the document management server 101 sorts the documents of list display objects in ascending order of attributes. On the other hand, if the orientation of the triangle for the sort button in high contrast is downward, the document management server 101 sorts the documents of list display objects in descending order of attributes. Also, if the sort button of attribute is in low contract without regard to the orientation of the triangle for the sort button in high contrast, the attribute is not employed for sort in the document management server 101.

In FIG. 3, since the attribute corresponding to the sort button 307 in high contrast is used for sort, and the orientation of the triangle is upward, the documents are sorted in ascending order of "update date and time" attribute. That is, the list of documents is displayed in the list display area 303 in chronological order of update date and time.

In this embodiment, the attribute used for sort by the document management server 101 and the value of sort order are held in the RAM 202 of the document management server 101 every time of session with the client. If there is no instruction for sort (e.g., when the session between the client computer 102 and the document management server 101 is established), the preset initial value is held. This initial value is such that the attribute used for sort by the document management server 101 is "update date and time", and the sort order is "ascending order", for example. The initial value is not limited to this, but may be any other attribute than the "update date and time". For every user, in the previous session, the attribute used for sort by the document management server 101 and the value of sort order may be stored in the HD 213 of the document management server 101, and employed as the initial value for the next session by the document management server 101.

If the folder of the folder tree 302 is selected in the window 301 by the user, the client computer 102 sends the event information to the document management server 101.

And the document management server 101 creates display data for displaying the list of documents within the folder in the list display area 303. Further, the document management server 101 also creates display data for updating the display of the folder tree 302 and expanding and displaying a sub-tree of the selected folder, if there is any folder within the folder selected by the user. Thereafter, the document management server 101 sends these display data to the client computer 102, which then displays the display data.

Also, if the retrieval button 305 is pressed in the window 301 by the user, the client computer 102 sends the keyword inputted into the keyword input area 304 and the event information to the document management server 101. And the document management server 101 performs retrieval based on the keyword, and creates display data for displaying the retrieval results, and the display data is displayed on the client computer 102. The details of this process will be described later.

Also, if any of the sort buttons 306 to 309 is pressed in the window 301 by the user, the client computer 102 sends the event information to the document management server 101. And the document management server 101 reads the event information and changes the sort method and the display after the sort button is pressed by the user in accordance with a state before the sort button is pressed by the user.

Specifically, if the state before the sort button is pressed by the user is low contrast, the document management server 101 uses the attribute corresponding to the sort button pressed by the user as the sort item. Also, if the state before the sort button is pressed by the user is low contrast, the document management server 101 performs sort in ascending order when the orientation of the triangle before the sort button is pressed by the user is upward, or in descending order when it is downward. And the document management server 101 displays the sort button in high contrast, with the same orientation of the triangle for the sort button as before the sort button is pressed by the user, on the display after the sort button is pressed by the user. Also, the document management server 101 displays the sort buttons other than the sort button pressed by the user in low contrast without changing the orientation of the triangle.

Also, if the state before the sort button is pressed by the user is high contrast, the document management server 101 uses the attribute of the sort button pressed by the user as the sort item. And the document management server 101 performs sort in descending order and changes the orientation of the triangle downward, when the orientation of the triangle before the sort button is pressed by the user is upward. On the other hand, the document management server 101 performs sort in ascending order and changes the orientation of the triangle upward, when the orientation of the triangle before the sort button is pressed by the user is downward. In this way, if the state before the sort button is pressed by the user is high contrast, the document management server 101 inverts the orientation of the triangle vertically, with the sort button kept in high contrast, and makes a retrograde order of sort. At this time, the display of the sort buttons other than the pressed sort button may not be changed.

In this way, if the sort button is pressed by the user while the list of documents is displayed, the document management server 101 performs the following process. That is, the document management server 101 creates list display data in which the list of documents being displayed is resorted according to the new sort attribute and sort order, and displays it on the client computer 102, in addition to changing the display of the sort buttons. At this time, the document management server 101 changes the attribute used for sort and the value of sort order held on the RAM 202.

Figure 4:
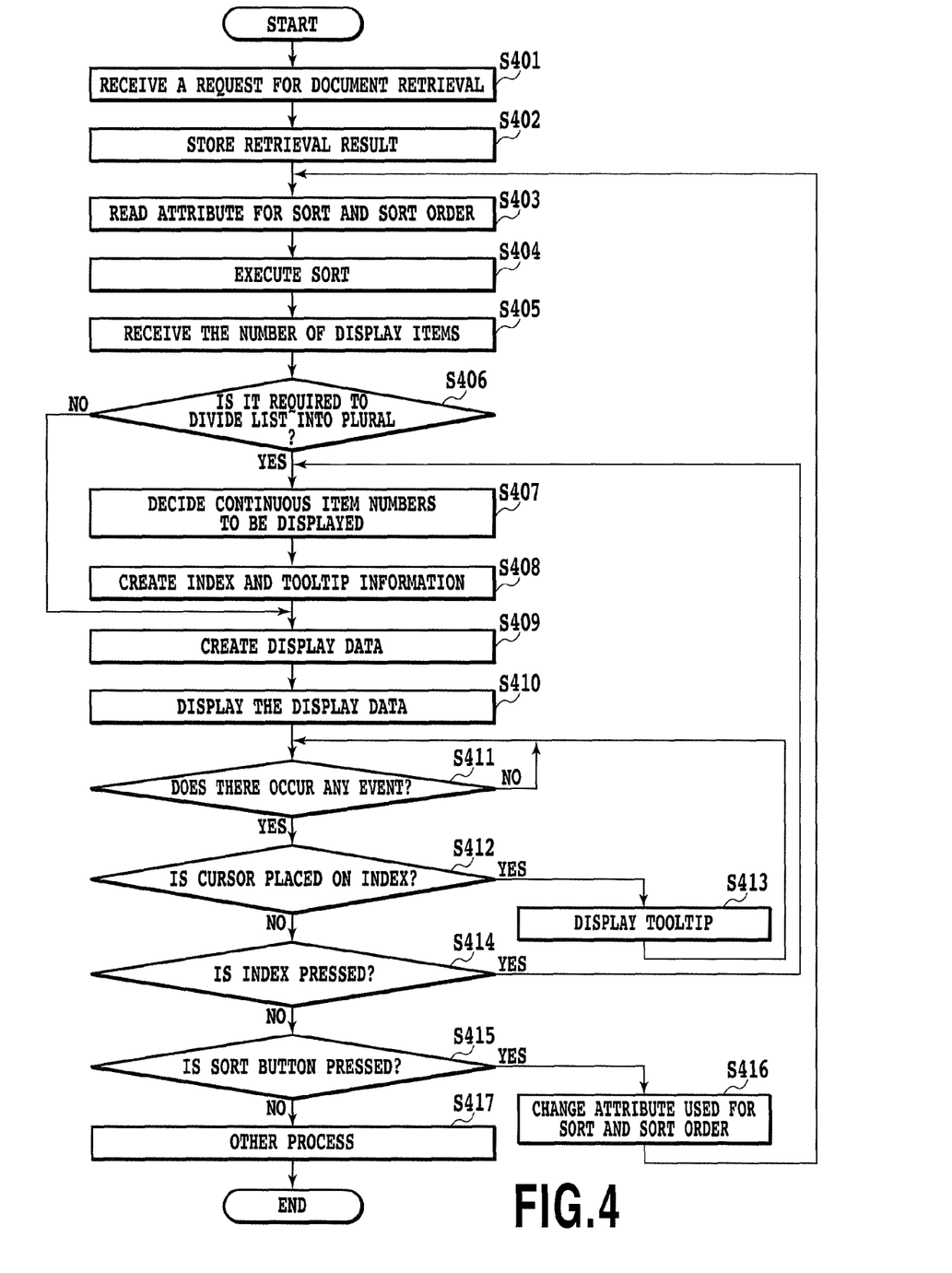
FIG. 4 is a flowchart according to the invention.

Referring to a flowchart in FIG. 4, the process performed by the client computer 102 and the document management server 101 when the retrieval button 305 is pressed by the user in the user interface as shown in FIG. 3 will be described below.

If the retrieval button 305 is pressed by the user, a retrieval request is sent to the document management server 101. At step S401, the document management server 101 receives a keyword inputted into the keyword input area 304 by the user, information of the sort button in high contrast, and the retrieval request from the client computer 102. The information on the attribute used for sort and the sort order is stored in the RAM 202.

At step S402, the document management server 101 makes full-text retrieval for the document stored on the HD 213 of the document management server 101, based on the keyword received from the client computer 102. And the document management server 101 stores the information of the document hit by full-text retrieval as the retrieval result in the RAM 202.

At step S403, the document management server 101 reads the information on the attribute used for sort and whether the sort order is ascending or descending from the RAM 202.

At step S404, the document management server 101 sorts the retrieval results on the RAM 202, based on the information read at step S403.

At step S405, the document management server 101 acquires the number of document information (number of display items) displayed as the list in the window 301 from a setting file. In this embodiment, this number is set to 10, for example, from an external setting file. The user may make an instruction to change the number of document information in the list displayed in the window 301 to change it at any time through the process in this embodiment. If an instruction for the number of display items is received from the client computer, the number of display items may be reset to the setting file.

At step S406, the document management server 101 determines whether or not it is required to divide the list of retrieval results by comparing the number of document information acquired from the setting file at step S405 and the number of retrieval results stored at step S402. The document management server 101 determines that it is required to divide the list of retrieval results, if the number of retrieval results is greater than the number of display items acquired from the setting file, and the operation goes to step S407. If not, the operation goes to step S409.

Figure 6:
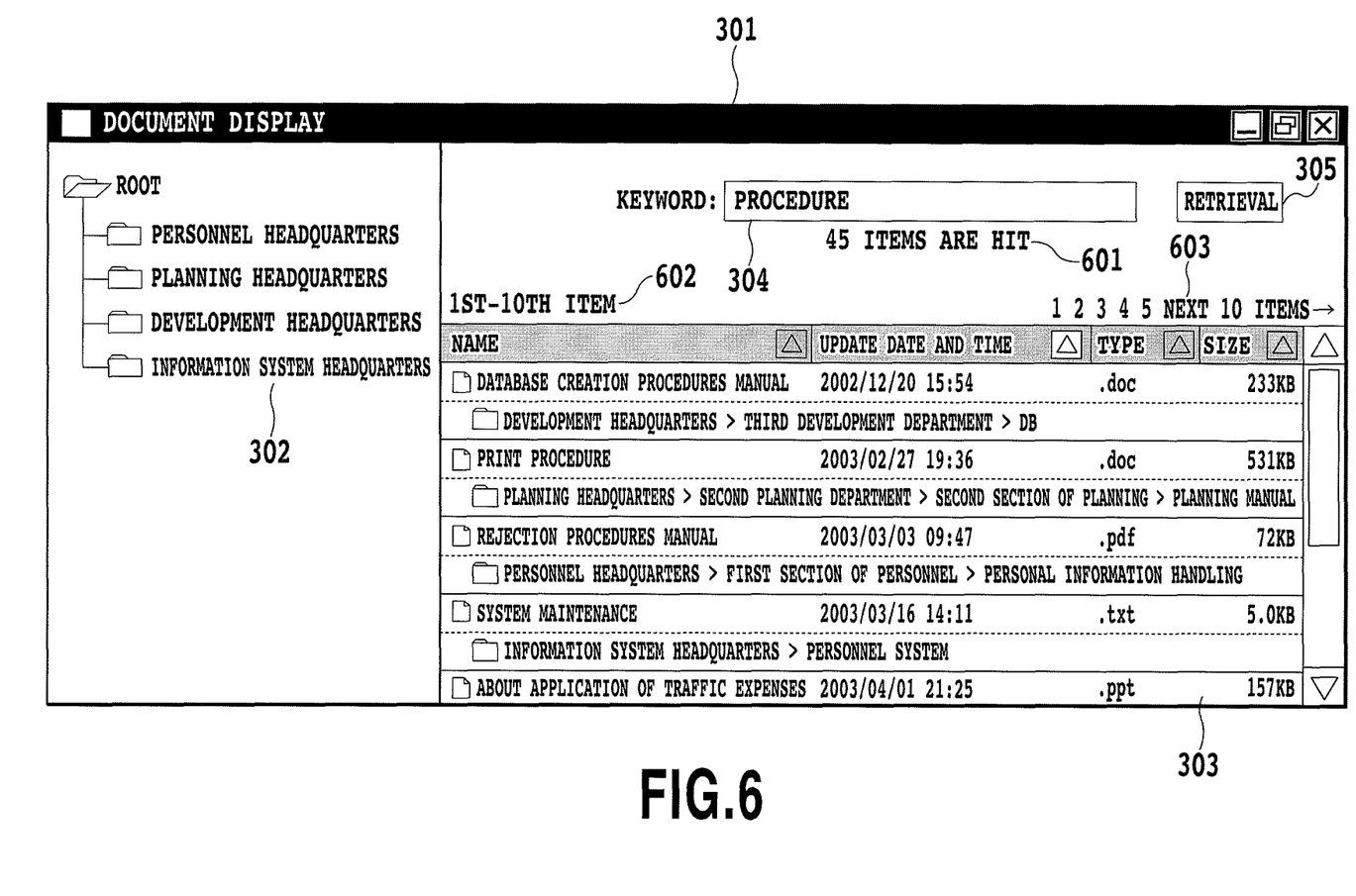
FIG. 6 is a view showing one example of the operation of the user interface according to the invention.

At step S407, the document management server 101 decides continuous item numbers of the document information in the sort order to be displayed. That is, the document management server 101 divides the list of retrieval results, and decides which of the divided lists (partial lists) is displayed. If the retrieval button 305 is pressed by the user, or the sort button is pressed by the user, the document information for the display number of items from the beginning in the sort order are firstly displayed in the window 301. At this time, the document information not contained in the list is displayed in another page (another partial list), whereby an index 603 indicating the link to another page is displayed as shown in FIG. 6. Also, if one of the index group 603 for the user interface as shown in FIG. 6 is pressed by the user, the operation is performed in the following way. That is, the link information of the index pressed by the user is sent from the client computer 102 to the document management server 101. And the document management server 101 decides continuous item numbers of document information in the divided list to be displayed, based on the page requested from the client computer 102. For example, when the index pressed by the user is 3 in this embodiment, it is decided that the 21st to 30th items are display object. That is, if the numerical value of the index pressed by the user is n in this example, the "(n−1)×10+1"th to "n×10"th items in the list of document information are decided as the display object.

At step S408, the document management server 101 creates the index information for displaying the index group 603 (see FIG. 6) to change the display page in the divided list.

Herein, the index information is created based on the number of retrieval results, information on the number of display items acquired at step S405 and information of display object at step S407. For example, if the number of retrieval results is 45 and the number of display items acquired at step S405 is 10, the indexes created by the client computer 102 are "1", "2", "3", "4" and "5". And the index "1" corresponds to the list of the first to tenth items, and the index "2" corresponds to the list of the eleventh to twentieth items. The indexes "3" and "4" similarly correspond, but the index "5" corresponds to the list of 41st to 45th items, except for the list of items included in the other indexes. That is, the relationship of "total number of retrieval results=(total number of indexes−1)×10+number of items included in the last index" is satisfied in this example. That is, because of "45=(5−1)×10+5" in this example, the above relationship is surely satisfied. At present, the index number corresponding to the list of documents decided as display object in the list display area 303 is displayed in different color or without link pasted to be distinguishable from the other indexes.

At present, if the lead document of all the sorted retrieval results is not included in the document information of display object in the list display area 303, information is created such that the index of "← previous 10 items" is displayed in addition to the number index. The index of "← previous 10 items" corresponds to the same list as the previous number of the index number of display object in the list display area 303. Also, if the last document of all the sorted retrieval results is not included in the document information of display object in the list display area 303, information is created such that the index of "next 10 items →" is displayed in addition to the number index. The index "next 10 items →" corresponds to the same list as the next number of the index number of display object in the list display area 303.

Figure 7:
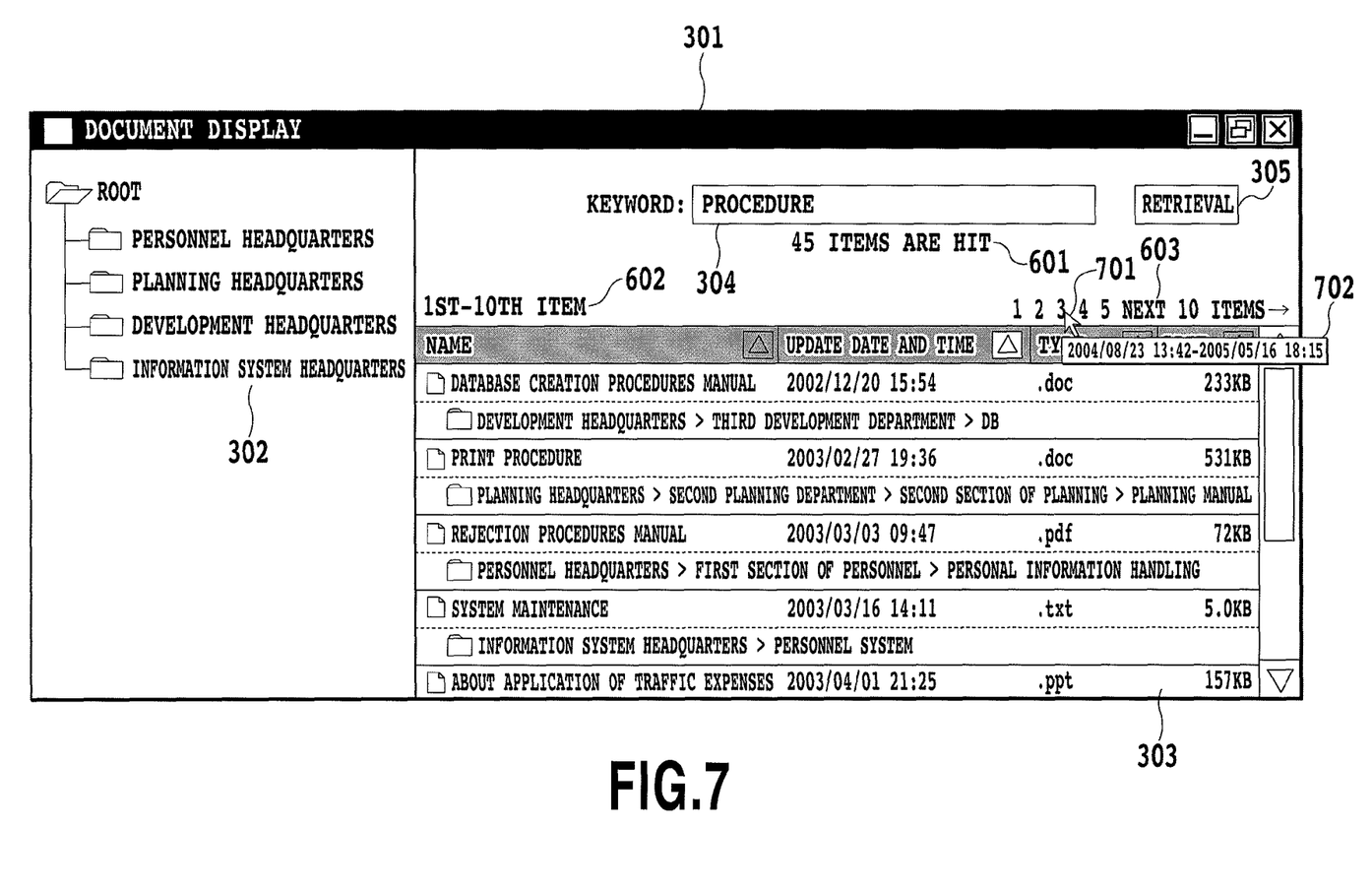
FIG. 7 is a view showing one example of the operation of the user interface according to the invention.

Also, at step S408, the document management server 101 creates information for displaying a tooltip 702 when a mouse cursor 701 is put over the index 603, as shown in FIG. 7. The information for displaying the tooltip 702 is the attribute value of the attribute used for sort at step S404, which is provided for the lead document and the last document in the list part corresponding to each index. For example, when the attribute used for sort by the document management server 101 is "update date and time", the information displayed in the tooltip of the index "1" is the update date and time of the first and tenth documents. Also, the information displayed in the tooltip of the index "next 10 items →" is the same as the information displayed in the tooltip of the index "2", when the list being displayed is the list corresponding to the index "1". Also, the information displayed in the tooltip of the index "← previous 10 items" is the same as the information displayed in the tooltip of the index "1", when the list being displayed is the list corresponding to the index "2".

At step S409, the document management server 101 creates partial list data using the information of document of display object, based on the sorted retrieval results held in the RAM 202 and the information decided at step S407. Further, the document management server 101 creates the display data to be displayed on the display, based on the created partial list data (page data of the partial list of display object) and the information of index and tooltip created at step S408. And the document management server sends the display data created through this display data creation process to the client computer 102. The display data for partial list once created may be cached in the document management server 101, to reduce a processing load, and quicken the response of list display.

At step S410, the client computer 102 receives the display data including partial list data created at step S409 and the information of index and tooltip created at step S408 and displays it on the display unit.

At step S411, the client computer 102 determines whether or not any event such as the button pressed by the user occurs. If any event occurs, the operation goes to step S412, or if not, repeats step S411.

At step S412, the client computer 102 determines whether or not the cursor is put on (mouseover) one of the indexes in the index group 603. If it is determined that the cursor is put, the operation goes to step S413. If not, the operation goes to step S414.

At step S413, the client computer 102 displays the information of tooltip corresponding to the index on which the cursor is put (see the tooltip 702 as shown in FIG. 7).

At step S414, the client computer 102 determines whether or not one of the indexes in the index group 603 is pressed (clicked) by a manipulation of the user. If the index group 603 is pressed by the user, the information regarding the pressed index is sent to the document management server 101, and the operation goes to step S407, where the document management server decides the document information corresponding to the pressed index to be display object. If not, the operation goes to step S415.

At step S415, the client computer 102 determines whether or not the sort button is pressed. If the sort button is pressed by the user, the information on the pressed sort button is sent to the document management server 101, and the operation goes to step S416. If not, the operation goes to step S417.

At step S416, the document management server 101 receives the state information of the pressed sort button and changes the attribute used for sort and the value of sort order which are held on the RAM 202 of the document management server 101. And turning back to step S403, the sorting process is performed again.

At step S417, the process corresponding to the occurrence of event, other than the above process, is performed. For example, if the document name listed in the list display area 303 is pressed by the user, the client computer sends the information of pressed document to the document management server to download and display the document.

Next, the document information will be described below.

Figure 5:
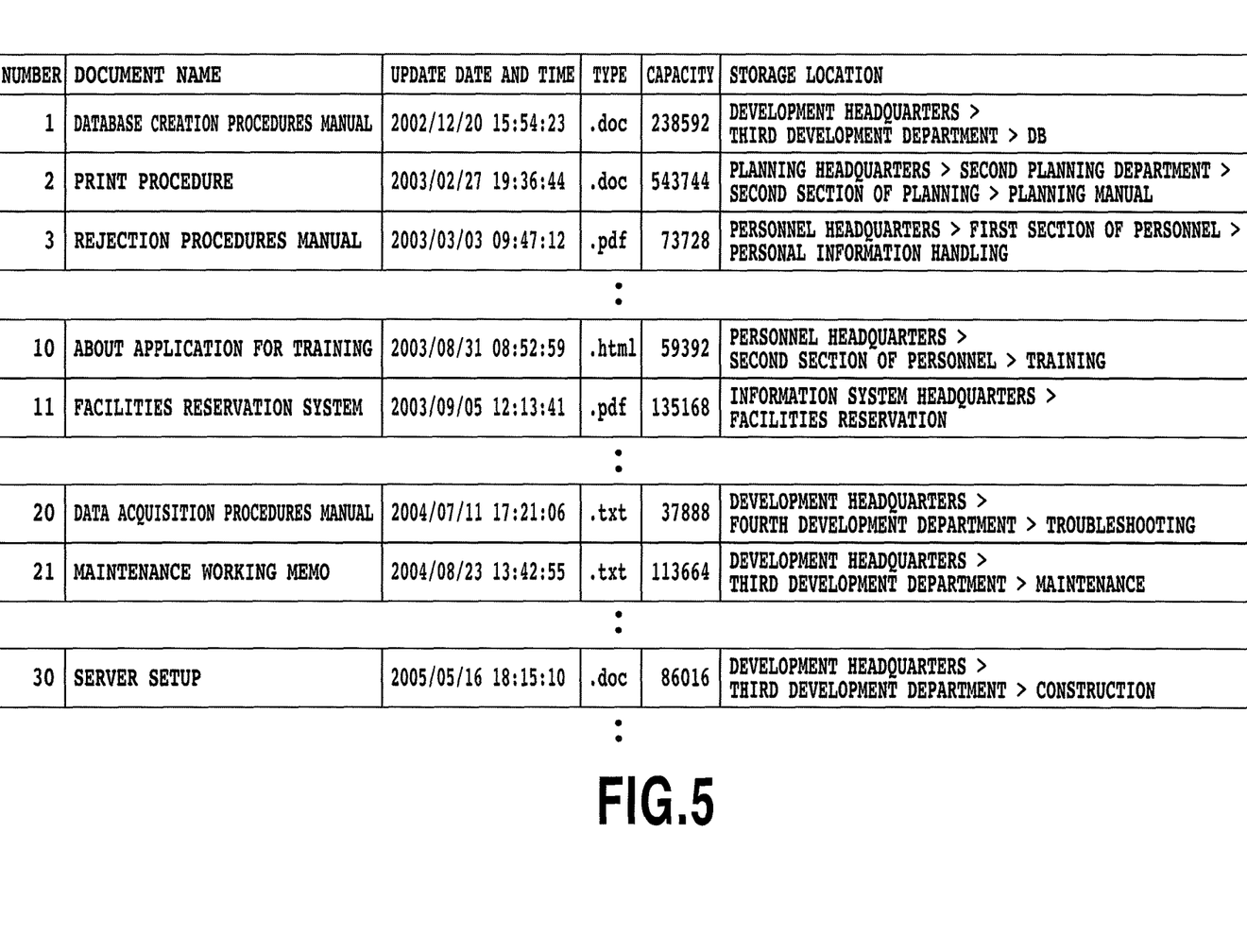
FIG. 5 is a view showing an example of a data structure of the retrieval results according to the invention.

FIG. 5 shows the information in which the document management server 101 sorts the retrieval results performed by the document management server 101 in ascending order of "update date and time" attribute when the user inputs "procedure" in the keyword input area 304 and presses the retrieval button 305 in the user interface.

In FIG. 5, the "number" indicates the sequence number in arrangement order sorted by the document management server 101. The "name" is the attribute representing the name of document, which is the character string type. The value of "update date and time" is the attribute representing the date and time when the document is updated lastly, which is the date type. The "type" is the attribute representing the type of document, which is the character string type. This value is an extension attached to the document file. The "size" is the attribute representing the size of document in bytes, which is the numerical value. The "storage location" is the character string representing the folder path in which the document is stored. In this embodiment, the list of documents can be sorted according to each attribute of "name", "update date and time", "type" and "size". The attributes as shown here are one example of attributes used in the document management, but not limited.

In this embodiment, the client computer 102 displays 10 items of document information in the list display area 303. Therefore, it is decided that the information of documents with numbers 1 to 10 are displayed in the list display area 303 in creating the first list display data after performing retrieval. And the other document information is displayed in the list display area 303 by changing every 10 items when the user presses the index of the index group 603 as will be described later.

The document list display will be described below.

FIG. 6 is an example of the user interface displayed on the client computer 102 at step S410. In FIG. 6, a text 601 indicates the number of items hit by retrieval in the document management server 101. A text 602 indicates continuous item numbers of the retrieval results to be displayed in the list display area 303. If the user presses the index group 603, the client computer 102 makes an instruction to change the list displayed in the list display area 303. If the user presses any of these indexes by manipulating the pointing device such as the mouse 210 in the client computer 102, the list corresponding to each index is displayed in the list display area 303. For example, if the user presses the index "2", the list of the 11th to 20th items is displayed in the list display area 303. Also, since the list corresponding to the index "1" is being displayed in FIG. 6, if the user presses the index "next 10 items →", the list of the 11th to 20th items is displayed in the list display area 303 in the same way as pressing the index "2". When the list from the 11th item, not shown, is displayed in the list display area, the index "← previous 10 items" is displayed to the left of the index "1". If the user presses the index "← previous 10 items" when the list of the 11th to 20th items corresponding to the index "2" is displayed, the list of first to tenth items corresponding to the index "1" is displayed.

Figure 8:
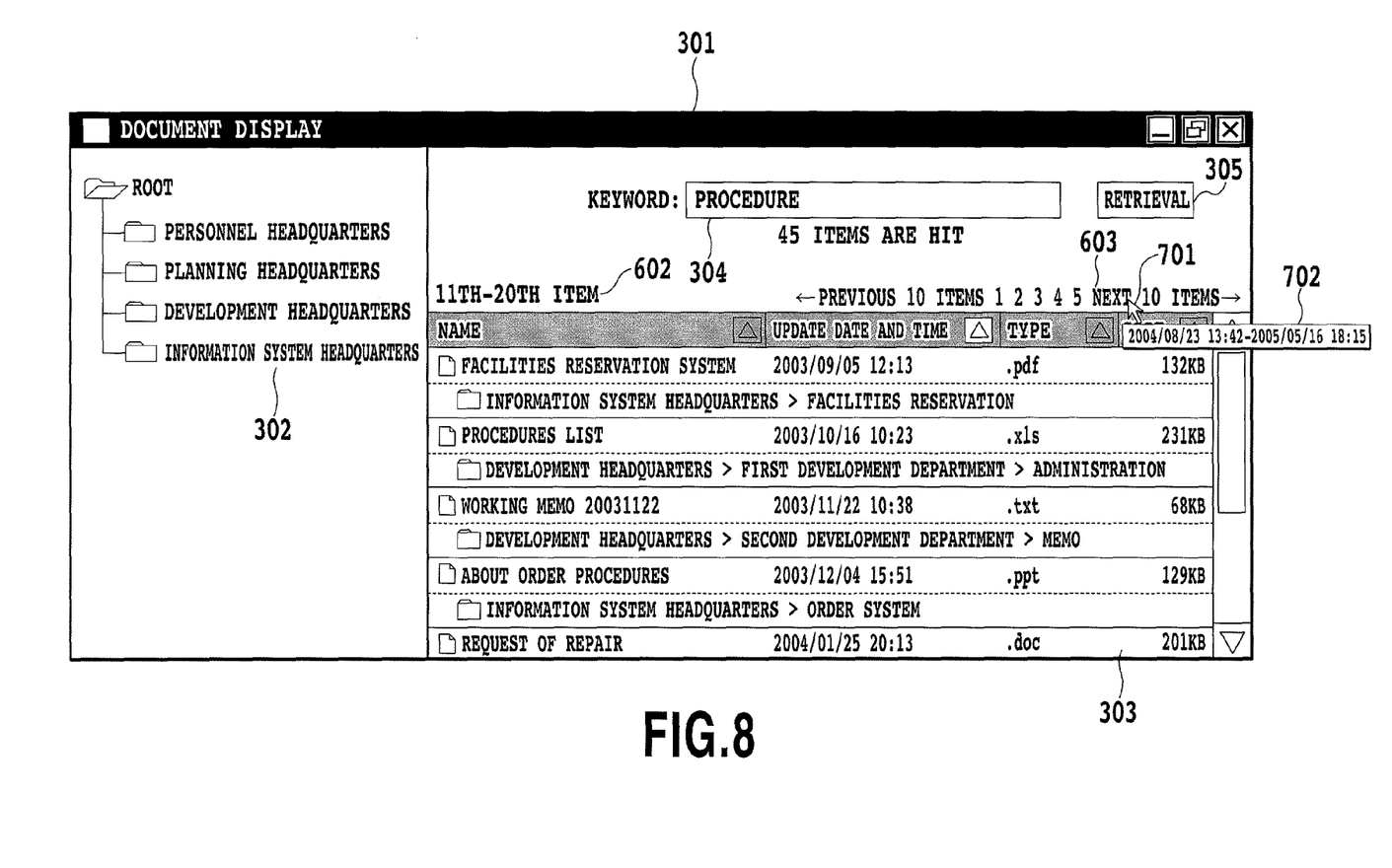
FIG. 8 is a view showing one example of the operation of the user interface according to the invention.

Referring to FIG. 7 and FIG. 8, the operation of the client computer 102 at step S413 will be described below in detail.

FIG. 7 shows a display example (display example at the time of a mouseover) when the cursor is put on the index "3" of the index group 603 in the user interface as shown in FIG. 6.

A cursor 701 as shown in FIG. 7 is a mouse cursor manipulated by the pointing device such as the mouse 210 for the client computer 102. The client computer 102 controls the display for the cursor 701 and a tooltip 702.

The tooltip 702 displays the values of attributes used for sort on the lead and last documents in the list corresponding to the index on which the cursor 701 is placed.

Since the sort is in ascending order of update date and time in the user interface as shown in FIG. 7, the tooltip 702 displays the values of update date and time for the documents with number 21 and number 30 in FIG. 5. If the cursor is put on the index "2", the tooltip 702 displays the values of update date and time for the documents with number 11 and number 20 in FIG. 5. Similarly, if the cursor is put on the index "4", the tooltip 702 displays the values of update date and time for the documents with number 31 and number 40 in FIG. 5. That is, since the range of attribute used for sort on the document information included in the list part corresponding to each index is displayed in the tooltip, the user can easily identify the document with what attribute is included in the page of what index.

FIG. 8 shows a display example in which the user clicks the index "2" within the index group 603 to display the list of 11th to 20th items and the cursor 701 is placed on the index "next 10 items →" in the user interface as shown in FIG. 6.

At this time, the tooltip 702 displays the value of attribute used for sort on the lead and last documents for the next 10 items (same as the list corresponding to the index "3") of the 10 items being displayed. That is, the tooltip 702 displays the update date and time of the 21st document and the update date and time of the 30th document in FIG. 8. Similarly, the tooltip 702 displays the value of attribute used for sort on the lead and last documents for the previous 10 items (same as the list corresponding to the index "1") of the 10 items being displayed, when the cursor is put on the index "← previous 10 items" within the index group 603. That is, when the mouse is over "← previous 10 items", the tooltip 702 displays the update date and time of the first document and the update date and time of the tenth item.

The display data generated by the document management server 101 to generate the display of the tooltip as described above and shown in FIGS. 7 and 8 will be described below.

Figure 9:
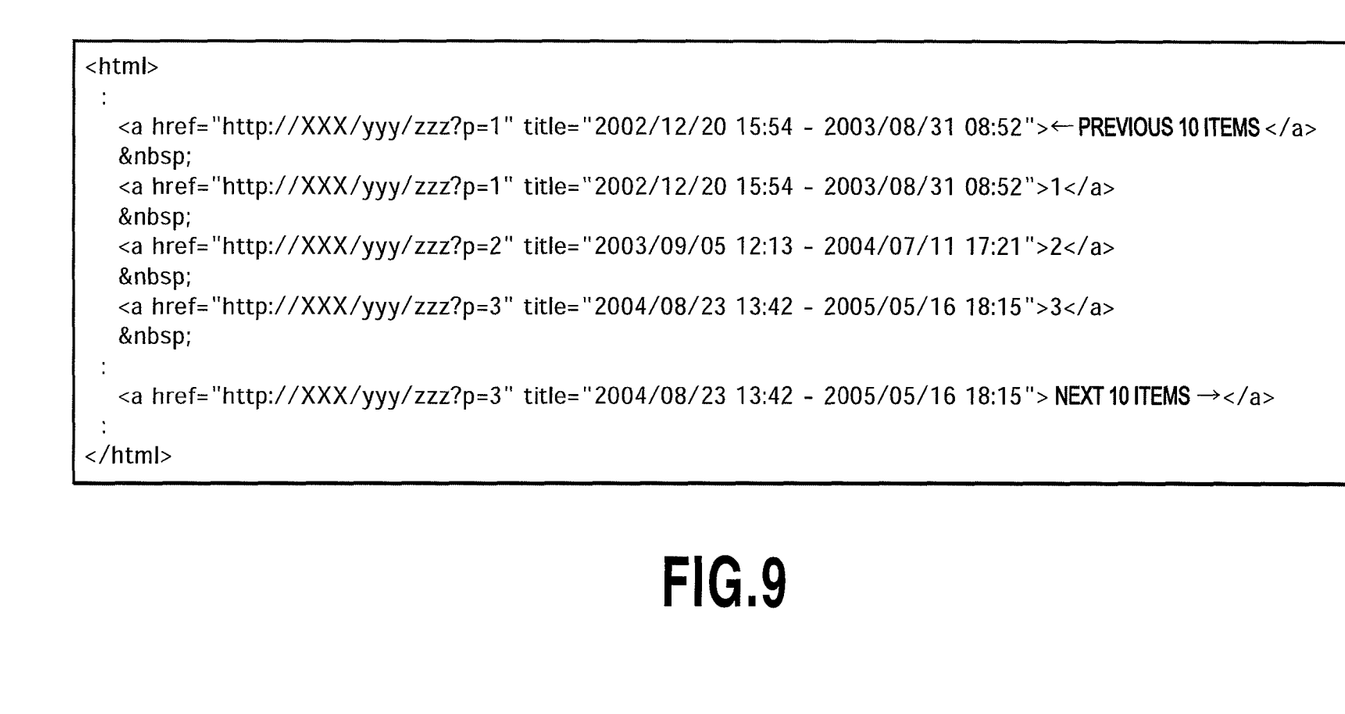
FIG. 9 is a view showing one example of an HTML code that can display a tooltip according to the invention.

FIG. 9 is one example of information that the document management server 101 creates at step S408 to make display like the tooltip 702 when the cursor is put on the index group 603. That is, FIG. 9 is one example where the index part is denoted in an HTML (Hyper Text Markup Language). In the HTML, the attribute value for display is described in a title attribute within <a> tag (link tag), for example, as shown in FIG. 9. And the HTML code is displayed on a browser of the client computer 102 that can interpret the HTML, thereby making display like the tooltip 702 as shown in FIGS. 7 and 8. A format of display data for use is not limited to the HTML, but other methods capable of implementing the same function may be employed.

As described above, in this embodiment, the attribute values of the lead and last documents in the list corresponding to each index of the index group 603 are displayed simply by placing the cursor on each index. Conventionally, the attribute of document included in the list corresponding to each index of the index group 603 was not known. Therefore, for example, when the user searches for the document with the update date and time on September, 2004, it was required with the prior art that the user presses each index exhaustively to change the display of list. On the contrary, in this embodiment, the user can know that the desired document is included in the index "3" simply by placing the cursor on each index, without changing the display of list exhaustively. Thereby, since the user can know the content of each index only by making the mouse over each index, the user can dispense with a work of repeatedly changing the display of list by pressing each index, whereby the trouble of the user is relieved.

Embodiment 2

A second embodiment of the invention will be described below.

Figure 10:
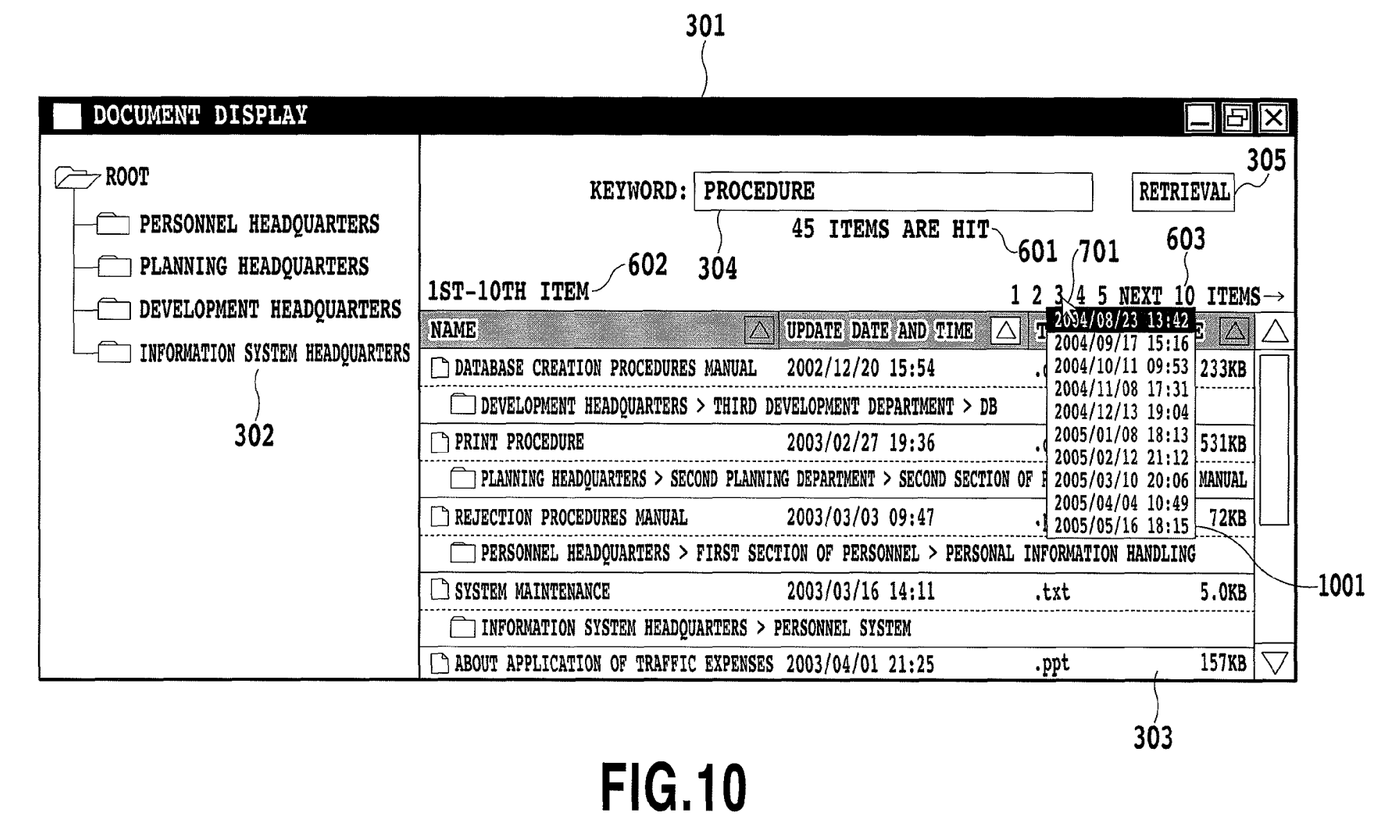
FIG. 10 is a view showing one example of the operation of the user interface according to the invention.

This second embodiment is different from the first embodiment in that if the mouse cursor rests on the index 603, a drop down list 1001 as shown in FIG. 10 is displayed, instead of the tooltip 702 as shown in FIGS. 7 and 8 in the first embodiment.

In FIG. 10, the client computer 102 displays the attribute values used for sort in the document management server for all the documents included in the page (partial list) corresponding to the index in the drop down list 1001. Further, if the user selects a desired value from the drop down list, the list corresponding to the index is displayed with the document name in the list display area 303 by adjusting the position of a vertical scroll bar to refer to the document corresponding to the selected value quickly. For example, with the HTML, an anchor point for each document in the page of the index may be given to each value of attribute included in the drop down list.

Thereby, the user can confirm the attribute values of all the documents in the list corresponding to the index, and further dispense with a work of manipulating the vertical scroll bar to find the desired document after the list is changed.

Other Embodiments

Though the display of retrieval results using the keyword is exemplified in the embodiments 1 and 2, this embodiment is also applicable where the documents within the folder are display list object. For example, if the folder is designated by the user, the information of document within the designated folder may be acquired and stored in the RAM 202, and the process from step S403 in FIG. 4 may be performed. Besides, this embodiment is applicable where the list of contents is displayed.

Though the attribute value is displayed in the tooltip or the drop down list in the above embodiments, the attribute value may be displayed in another display format.

The process of the above embodiments is only illustrative, and all the process may be performed by the client computer 102, or by the document management server 101. Also, the allocation of the process to the client computer 102 and the document management server 101 as shown in the embodiments is only illustrative, but the process may be allocated in other ways.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-125533, filed May 10, 2007, which is hereby incorporated by reference herein in its entirety.

What is claimed is:

1. A display method comprising:
receiving input of a keyword from a user;
displaying a first list and an index, the displayed first list being a list of contents included in a first subset of a set of a plurality of contents, the displayed index being an index corresponding to a second subset of the set, wherein each of the plurality of contents includes the keyword, and wherein the first subset and the second subset are different from each other;
displaying a second list instead of the first list in response to a user clicking the index, the second list being a list of contents included in the second subset corresponding to the clicked index; and
displaying, in response to the user hovering a cursor over the displayed index, attribute information of leading and last contents among the contents included in the second subset corresponding to the hovered-over index while the first list of the contents of the first subset remains displayed, wherein attribute information of contents other than the leading and last contents among the contents included in the second subset corresponding to the hovered-over index are not displayed in response to the user hovering the cursor over the displayed index.

2. The display method according to claim 1, wherein the index corresponding to the second subset is provided with a link to the second list of the contents included in the second subset.

3. The display method according to claim 1 further comprising accepting from the user, a selection of an attribute to be used for sorting the contents,
wherein the first displaying includes:
sorting, based on an attribute value of the selected attribute of each content, the plurality of contents each including the keyword; and
determining, in accordance with the sorted order, the first subset and the second subset of the set.

4. The display method according to claim 3, wherein the attribute information of at least the leading content refers to an attribute value of the selected attribute of the first content.

5. The display method according to claim 1, wherein the list refers to a list of content names.

6. The display method according to claim 1, wherein each of the plurality of contents refers to a document file.

7. A display method comprising:
displaying a first list, a first index and a second index, the displayed first list being a list of contents included in a first subset of a set of a plurality of contents, the displayed first index being an index corresponding to the first subset, the displayed second index being an index corresponding to a second subset of the set, wherein the first subset and the second subset are different from each other;
displaying a second list instead of the first list in response to a user clicking the displayed second index, the second list being a list of contents included in the second subset; and
displaying, in response to the user hovering a cursor over the displayed second index, attribute information of leading and last contents among the contents included in the second subset corresponding to the hovered-over index while the first list of the contents included in the first subset remains displayed, wherein attribute information of contents other than the leading and last contents among the contents included in the second subset corresponding to the hovered-over index are not displayed in response to the user hovering the cursor over the displayed index.

8. The display method according to claim 7, wherein the index corresponding to the second subset is provided with a link to the second list of the contents included in the second subset.

9. The display method according to claim 7 further comprising accepting from the user, a selection of an attribute to be used for sorting the contents,
wherein the first displaying includes:
sorting the plurality of contents based on an attribute value of the selected attribute of each content; and
determining, in accordance with the sorted order, the first subset and the second subset of the set.

10. The display method according to claim 9, wherein the attribute information of at least the leading content refers to an attribute value of the selected attribute of the first content.

11. The display method according to claim 7, wherein the list refers to a list of content names.

12. The display method according to claim 7, wherein each of the plurality of contents refers to a document file.

13. A display control apparatus comprising:
a memory that stores a computer program; and
a processor that executes the computer program stored in the memory, the processor configured to:
acquire a keyword input by a user;
control to display, a first list and an index, the displayed first list being a list of contents included in a first subset of a set of a plurality of contents, the displayed index being an index corresponding to a second subset of the set, wherein each of the plurality of contents includes the keyword, and wherein the first subset and the second subset are different from each other;
control to display, in response to the user clicking the index being displayed, a second list instead of the first list, the second list being a list of contents included in the second subset corresponding to the clicked index; and
control to display, in response to the user hovering a cursor over the displayed index, attribute information of leading and last contents among the contents included in the second subset corresponding to the hovered-over index to be displayed while the first list of the contents included in the first subset remains displayed, wherein attribute information of contents other than the leading and last contents among the contents included in the second subset corresponding to the hovered-over index are not displayed in response to the user hovering the cursor over the displayed index.

14. The display control apparatus according to claim 13, wherein the index of the second subset is provided with a link to the second list of the contents included in the second subset.

15. The display control apparatus according to claim 13, the processor further configured to:
acquire from the user, a selected attribute to be used for sorting the contents,
sort, based on an attribute value of the selected attribute of each content, the plurality of contents each including the keyword; and
determine, in accordance with the sorted order, the first subset and the second subset of the set.

16. The display control apparatus according to claim 15, wherein the attribute information on the first content refers to an attribute value of the selected attribute of the first content.

17. The display control apparatus according to claim 13, wherein each of the plurality of contents refers to a document file and the list refers to a list of content names.

* * * * *